A. L. AND H. W. FISHER.
WEIGHT CONTROLLED MEASURING APPARATUS.
APPLICATION FILED MAR. 20, 1920.

1,368,129.

Patented Feb. 8, 1921.
2 SHEETS—SHEET 1.

A. L. Fisher
H. W. Fisher INVENTORS

BY Victor J. Evans
ATTORNEY

WITNESSES

A. L. AND H. W. FISHER.
WEIGHT CONTROLLED MEASURING APPARATUS.
APPLICATION FILED MAR. 20, 1920.
1,368,129.
Patented Feb. 8, 1921.
2 SHEETS—SHEET 2.
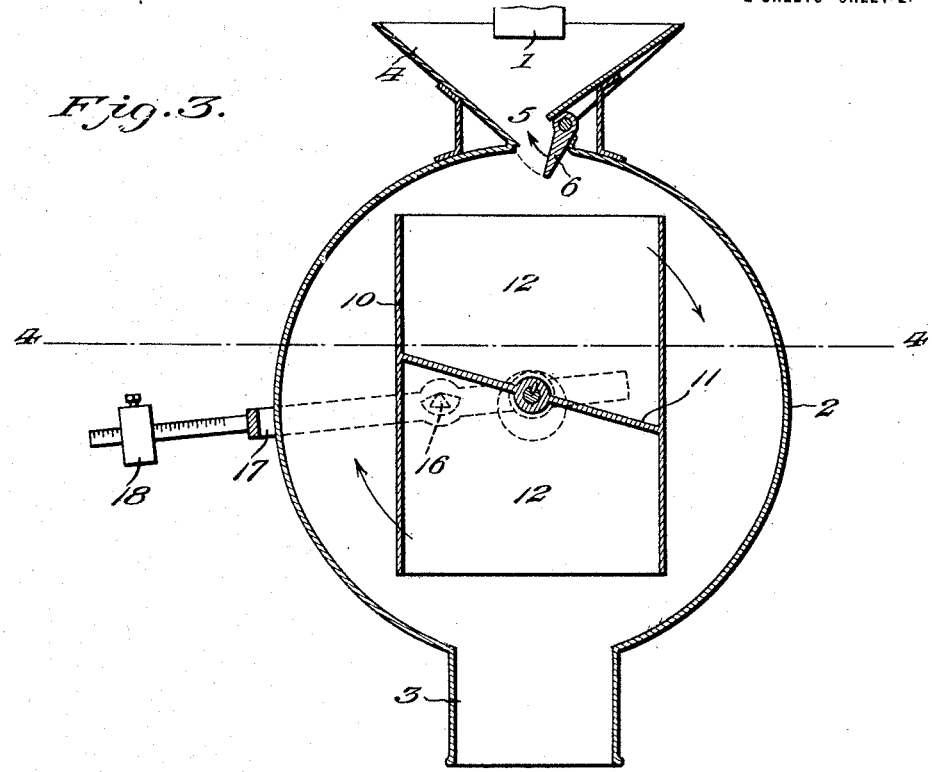
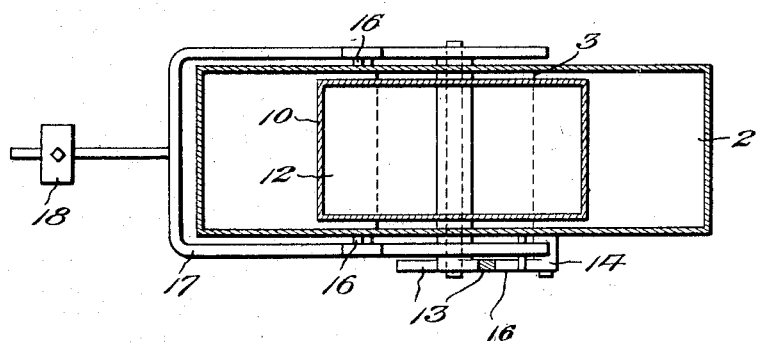
A. L. Fisher
H. W. Fisher INVENTORS
BY Victor J. Evans
ATTORNEY
WITNESSES

UNITED STATES PATENT OFFICE.

ANDREW LOUIS FISHER AND HENRY W. FISHER, OF ST. LOUIS, MISSOURI.

WEIGHT-CONTROLLED MEASURING APPARATUS.

1,368,129. Specification of Letters Patent. Patented Feb. 8, 1921.

Application filed March 20, 1920. Serial No. 367,579.

*To all whom it may concern:*

Be it known that we, ANDREW L. FISHER and HENRY W. FISHER, citizens of the United States, residing at St. Louis, State of Missouri, have invented new and useful Improvements in Weight-Controlled Measuring Apparatus, of which the following is a specification.

The object of our present joint invention is the provision of a simple, compact and reliable weight-controlled measuring apparatus designed for use to advantage in conjunction with threshing machines.

To the attainment of the foregoing, the invention consists in the improvement as hereinafter described and definitely claimed.

In the accompanying drawings, hereby made a part hereof:

Fig. 3 is a longitudinal vertical section of the apparatus *per se*.

Fig. 4 is a horizontal transverse section of the apparatus taken in the plane indicated by the line 4—4 of Fig. 3, looking downwardly.

Similar numerals of reference designate corresponding parts in all of the views of the drawings.

Figure 1:
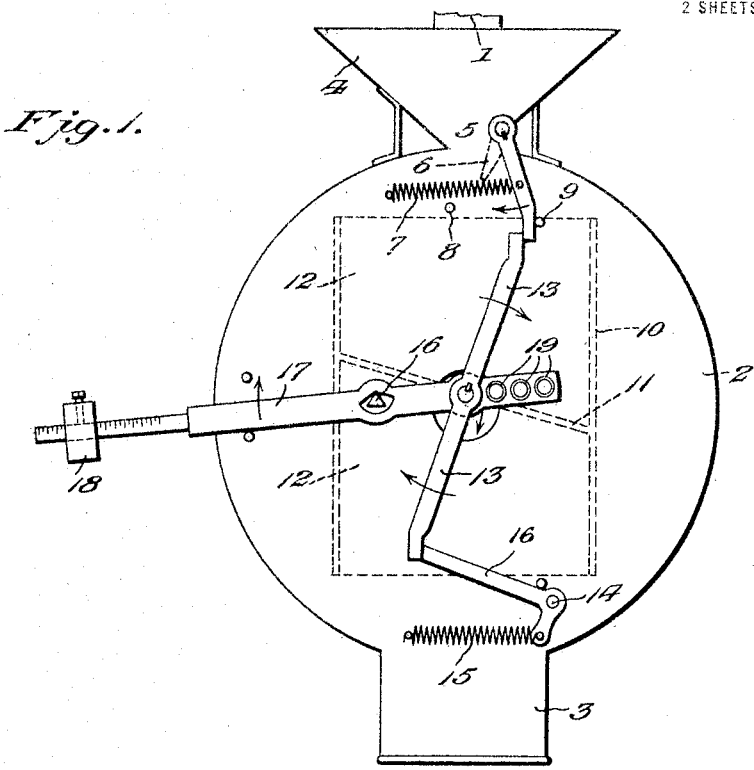
Figure 1 is a view illustrating our apparatus in side elevation as properly arranged relatively to the discharge spout of a threshing machine.

At 1 in Figs. 1 and 3 is the grain discharge spout of a threshing machine, and at 2 is the casing of our novel apparatus; the said casing 2 being provided with a pendent discharge spout 3, and being also provided on its top with a mouth 4 adapted to receive grain from the before-mentioned discharge spout 1. The said mouth 4 is tapered downwardly and its eduction orifice 5 is controlled by a movable cut-off 6 that is moved to and yieldingly retained in its closed position through the medium of a retractile spring 7. The said cut-off 6 is disposed and adapted to play between stops 8 and 9, preferably in the form of pins, carried by the casing 2.

Revoluble in the casing 2 is a hopper 10, divided through the medium of a center board 11 into two compartments 12, each of which is open at its outer end as illustrated.

Fixed with respect to the hopper 10 and arranged diagonally relatively thereto is an arm 13 that extends in opposite directions from the center of movement of the hopper 10.

Figure 2:
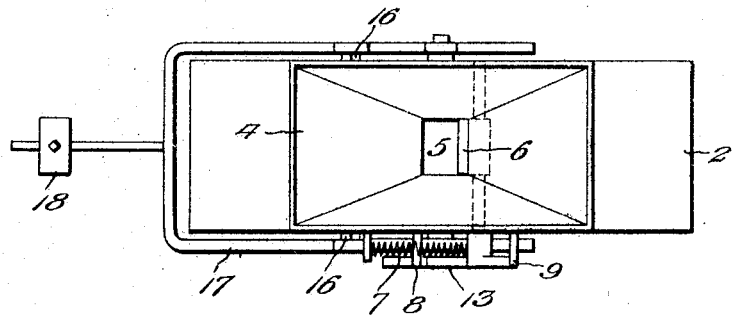
Fig. 2 is a plan of our novel apparatus *per se*.

Pivoted at 14 in the casing 2, and normally retained in yielding manner in the position illustrated in Fig. 2 by a retractile spring 15, is the swinging hopper locking member 16 of the improvement.

In addition to the elements set forth, our novel apparatus comprises a triangular balance pin 16, a balance bar 17, a regulating weight 18, adjustable and adjustably fixed on the bar 17, and a register 19 carried by the said bar 17.

In the practical operation of our apparatus, when either compartment of the revoluble hopper is filled to the predetermined weight, the hopper arm 13 is gravitationally released from the movable cut-off 6, whereupon the hopper is turned through half of a circle, and the grain therein is discharged through the pendent spout 3. The said turning of the hopper 10 also has the effect of positioning the empty compartment 12 to receive grain from the mouth 4; the movement of the empty compartment into the said position being attended by the opening of the cut-off 6, whereupon the grain will flow into the compartment 12 that is then uppermost, until the predetermined weight of grain is deposited therein, whereupon the operation described will be repeated.

Practical experience has demonstrated that our novel apparatus, notwithstanding its simplicity of construction, is reliable in its automatic operation, and is well adapted to withstand the usage to which weight-controlled measures are ordinarily subjected.

Having described our invention, what we claim and desire to secure by Letters-Patent, is:

A weight-controlled measuring apparatus including a casing having an inlet and an outlet, a weighted balance bar, means on which the same is fulcrumed at an intermediate point of its length, a revoluble gravitational hopper disposed and movable in the casing between the inlet and outlet and carried by the inner arm of the balance bar, a diagonal arm fixed with respect to the hopper and arranged exteriorly of and at the side of the casing, a swinging cut-off complementary to the inlet, spaced stops at the side of the casing, an arm fixed with respect to the cut-off and movable between said stops, a retractile spring carried by the casing and connected with said arm, a swinging hopper-locking member pivoted to the casing, a spring to move said member, and a stop to limit the movement of the member under the action of the spring.

In testimony whereof we affix our signatures.

ANDREW LOUIS FISHER.
HENRY W. FISHER.